(12) United States Patent
Duan et al.

(10) Patent No.: US 10,672,205 B2
(45) Date of Patent: Jun. 2, 2020

(54) METHOD AND APPARATUS TO MONITOR AN ON-VEHICLE FLUIDIC SUBSYSTEM

(71) Applicant: GM GLOBAL TECHNOLOGY OPERATIONS LLC, Detroit, MI (US)

(72) Inventors: Shiming Duan, Ann Arbor, MI (US); Yao Hu, Sterling Heights, MI (US); Christopher H. Knieper, Chesaning, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 15/830,262

(22) Filed: Dec. 4, 2017

(65) Prior Publication Data

US 2019/0172274 A1   Jun. 6, 2019

(51) Int. Cl.
*G07C 5/08* (2006.01)
*F16H 59/00* (2006.01)
*G07C 5/00* (2006.01)

(52) U.S. Cl.
CPC .......... *G07C 5/0808* (2013.01); *F16H 59/00* (2013.01); *G07C 5/008* (2013.01)

(58) Field of Classification Search
CPC ........ G07C 5/0808; G07C 5/008; F16H 59/00
See application file for complete search history.

(56) References Cited

U.S. PATENT DOCUMENTS

| 2005/0123408 | A1* | 6/2005 | Koehl | F04D 15/0088 417/53 |
| 2010/0191402 | A1* | 7/2010 | Aldrich, III | B60W 10/30 701/33.9 |
| 2015/0152860 | A1* | 6/2015 | Darak | F04B 49/065 417/12 |
| 2015/0152861 | A1* | 6/2015 | Stoner | F02D 41/22 73/168 |
| 2016/0194942 | A1* | 7/2016 | Wiegman | F04B 17/03 166/250.15 |
| 2016/0195082 | A1* | 7/2016 | Wiegman | F04B 49/065 417/53 |
| 2017/0059038 | A1* | 3/2017 | Miura | B60W 30/18018 |
| 2018/0167005 | A1* | 6/2018 | Shim | F04B 17/03 |

* cited by examiner

*Primary Examiner* — Courtney D Heinle
(74) *Attorney, Agent, or Firm* — Quinn IP Law

(57) ABSTRACT

A vehicle including a fluidic subsystem composed of an electric motor, a motor driver and a fluidic pump that is disposed in a fluidic circuit of the vehicle is described. A controller includes an instruction set that is executable to determine operating parameters associated with the fluidic subsystem, and determine a plurality of power efficiency parameters for the fluidic subsystem based upon the operating parameters. The power efficiency parameters include a hydraulic power efficiency, an electro-mechanical power efficiency and an electric power efficiency. The controller can determine a state of health for the fluidic subsystem based upon the power efficiency parameters, and detect a fault in the fluidic subsystem when the state of health is less than a threshold state of health. The fault can be communicated to a vehicle operator.

19 Claims, 3 Drawing Sheets

METHOD AND APPARATUS TO MONITOR AN ON-VEHICLE FLUIDIC SUBSYSTEM

INTRODUCTION

Vehicles may benefit from on-board monitoring systems that are configured to detect occurrence of a fault or another indication of a need for service and/or vehicle maintenance.

SUMMARY

A vehicle includes a fluidic subsystem that includes an electric motor electrically connected to a motor driver and rotatably connected to a fluidic pump that is disposed in a fluidic circuit of the vehicle, and a controller that is in communication with the electric motor, the motor driver and the fluidic circuit. The controller includes an instruction set that is executable to determine operating parameters associated with the fluidic subsystem, and determine a plurality of power efficiency parameters for the fluidic subsystem based upon the operating parameters. The power efficiency parameters include a hydraulic power efficiency, an electro-mechanical power efficiency and an electric power efficiency. The controller determines a state of health for the fluidic subsystem based upon the power efficiency parameters, and detect a fault in the fluidic subsystem when the state of health is less than a threshold state of health. The fault is communicated to a vehicle operator.

An aspect of the disclosure includes the vehicle including a telematics device, wherein the controller is configured to communicate the fault to an off-board controller via the telematics device.

Another aspect of the disclosure includes determining the electric power efficiency, which includes determining DC electric power including a DC current and a DC voltage delivered to the motor driver, determining AC electric power including an AC current and an AC voltage delivered from the motor driver to the electric motor, and determining the electric power efficiency based upon a ratio of the DC electric power and the AC electric power.

Another aspect of the disclosure includes determining the electro-mechanical power efficiency, which includes determining AC electric power including an AC current and an AC voltage delivered from the motor driver to the electric motor, determining mechanical power generated by the electric motor, including a torque output and a rotational speed of the electric motor, and determining the electro-mechanical power efficiency based upon a ratio of the AC electric power and mechanical power.

Another aspect of the disclosure includes determining the hydraulic power efficiency, which includes determining mechanical power transferred from the electric motor to the pump, including a torque output and a rotational speed of the electric motor, determining hydraulic power output from the pump, including a pressure differential and a mass flowrate in the fluidic circuit, and determining the hydraulic power efficiency based upon a ratio of the mechanical power and the hydraulic power.

Another aspect of the disclosure includes determining the state of health (SOH) for the fluidic subsystem based upon the power efficiency parameters, which includes determining a first SOH parameter based upon the hydraulic power efficiency and a nominal hydraulic power efficiency, determining a second SOH parameter based upon the electro-mechanical power efficiency and a nominal electro-mechanical power efficiency, determining a third SOH parameter based upon the electric power efficiency and a nominal electric power efficiency, and determining the SOH for the fluidic subsystem based upon the first SOH parameter, the second SOH parameter and the third SOH parameter.

Another aspect of the disclosure includes determining a fault in an element of the fluidic subsystem based upon the power efficiency parameters.

Another aspect of the disclosure includes isolating the fault in the fluidic subsystem to one of the electric motor, the motor driver or the fluidic pump based upon the plurality of power efficiency parameters.

Another aspect of the disclosure includes determining a fault associated with the motor driver when the electric power efficiency is less than an associated threshold efficiency level.

Another aspect of the disclosure includes determining a fault associated with the electric motor when the electro-mechanical power efficiency is less than an associated threshold efficiency level.

Another aspect of the disclosure includes determining a fault associated with the pump when the hydraulic power efficiency is less than an associated threshold efficiency level.

Another aspect of the disclosure includes communicating the fault to a human-machine interface device in communication with the on-board controller.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
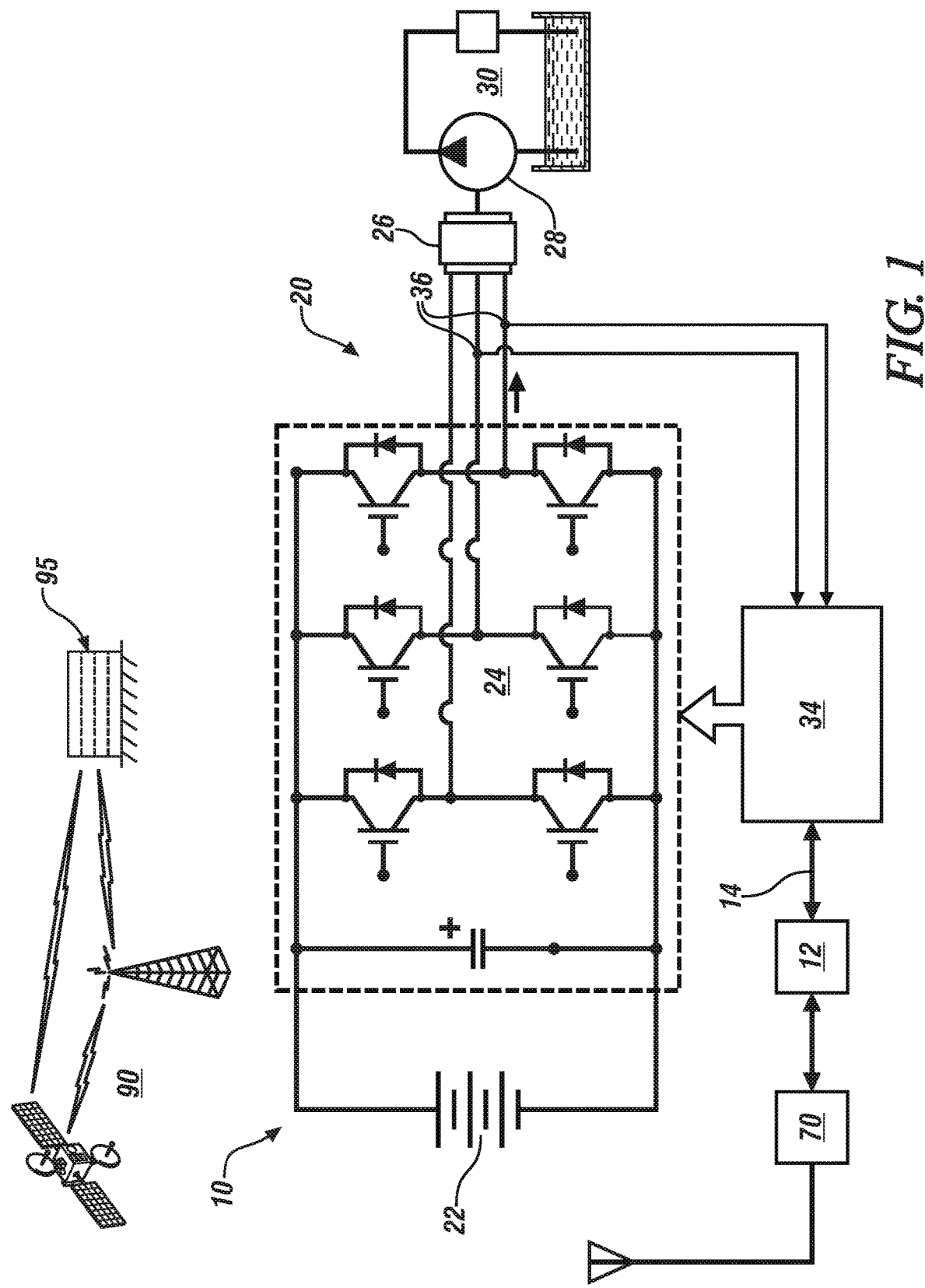
FIG. 1 schematically shows a fluidic subsystem disposed on a vehicle, which includes an electric motor that is coupled to a fluidic pump, wherein the fluidic pump is disposed to pump fluid in a fluidic circuit, in accordance with the disclosure.

Referring to the drawings, wherein like reference numerals correspond to like or similar components throughout the several Figures, FIG. 1, consistent with embodiments disclosed herein, schematically shows a fluidic subsystem 10 that is disposed on a vehicle. The fluidic subsystem 10 includes a pumping device 20 that is composed of an electric motor 26 that is coupled to a fluidic pump 28, wherein the fluidic pump 28 includes a housing and impeller that are disposed to pump fluid in a fluidic circuit 30 of the vehicle (not shown). The vehicle may be configured, by way of non-limiting examples, as a passenger vehicle, a light-duty or heavy-duty truck, a utility vehicle, an agricultural vehicle, an industrial/warehouse vehicle, or a recreational off-road vehicle. Other vehicles may include airships and watercraft.

The fluidic circuit 30 may be an on-vehicle fluidic circuit, including, e.g., a power-steering fluid system, an engine cooling system, a transmission cooling system, etc. The fluidic pump 28 includes a rotatable impeller that is coupled to an output shaft of an electric machine 26, and may be configured as a positive displacement device, a centrifugal device, or another pump element. In one embodiment, the electric machine 26 is a three-phase brushless DC electric motor. Electric power originating from a DC power source 22 is supplied to the electric machine 26 via a motor driver 24 and associated motor controller 34. In one embodiment, the motor driver 24 is an inverter that includes a plurality of controllable switches, e.g., IGBTs, and the motor controller 34 is configured to control the switches of the motor driver 24, which converts the DC power from the DC power source 22 to AC power that is supplied to the electric machine 26. Current sensors 36 may be arranged on electric power links that are disposed between the motor driver 24 and the electric machine 26, and provide AC current feedback to the motor controller 34. The motor controller 34 is in communication with a system controller 12, which monitors operation of various other on-vehicle systems and generates commands to operate the motor controller 34 to control the electric machine 26 to operate the pump 28 to pump fluid through the fluidic circuit 30 based upon operator commands and other operating conditions. The system controller 12 communicates with other on-vehicle controllers, e.g., a telematics device 70, via the communication link 14.

This arrangement of the elements of the fluidic subsystem 10 is illustrative. In one embodiment, the fluidic pump 28 and electric machine 26 are a stand-alone device, and the motor driver 24 and motor controller 34 are physically integrated into the system controller 12 with electrical connection therebetween via electrical cables. Alternatively, the motor driver 24 and motor controller 34 can be physically integrated into the electric machine 26, which is coupled to the fluidic pump 28, and the motor controller 34 communicates with the system controller 12 via the communication link 14.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of operating parameters and regularly or periodically updating the states of the operating parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link, and is indicated by line 14. Communication includes exchanging data signals in suitable form, including, for example, electrical signals via a conductive medium, electro-magnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electro-magnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The telematics device 70 includes a wireless telematics communication system capable of extra-vehicle communications, including communicating with a communication network system 90 having wireless and wired communication capabilities. The telematics device 70 is capable of extra-vehicle communications that includes short-range vehicle-to-vehicle (V2V) communication. Alternatively or in addition, the telematics device 70 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 70. The handheld device is disposed to execute extra-vehicle communication, including communicating with an off-board server 95 via the communication network 90. Alternatively or in addition, the telematics device 70 executes extra-vehicle communication directly by communicating with the off-board server 95 via the communication network 90.

The terms "prognosis", "prognostics", and related terms are associated with data monitoring and algorithms and evaluations that render an advance indication of a likely future event associated with a component, a subsystem, or a system. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a fault in the operation of the component, subsystem, or system ("Red" or "R"). The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routine that operate to lessen the effect of a fault in a component, subsystem or system.

Monitoring the electric machine 26 can introduce challenges when the motor controller 34 is operating at high-frequency, e.g., at 50 kHz, due to effect of dynamic nature of current and voltage levels during operation and periodic sampling rates of the current and voltage levels. The top portion of FIG. 2 graphically shows voltage 210 that is transferred from the motor controller 34 to the electric machine 26, including magnitudes of phase voltages 212, 214 and 216 in relation to time on the horizontal axis. The middle portion of FIG. 2 graphically shows current 220 that is transferred from the motor controller 34 to the electric machine 26, including magnitudes of phase currents 222, 224 and 226 in relation to time, and corresponding in time to the voltage 210. The phase voltages 212, 214 and 216 and phase currents 222, 224 and 226 are examples of electric power that may be supplied from the motor driver 24 to the electric machine 26 that is described with reference to FIG. 1. The bottom portion of FIG. 2 graphically shows total electric power 230 that is transferred from the motor controller 34 to the electric machine 26, which corresponds in time to the voltage 210 and current 220. As shown, sampling periods and time can introduce sampling errors in magnitudes the phase voltage and phase current due to an incomplete measurement of the operating parameter, whereas the corresponding total electric power is less affected by sampling errors. These results indicate that electric power signals have less variation than phase current and voltage signals to the electric machine 26, and thus are more robust and accurate, and better suited for communication to a remotely-located controller via a low rate communication bus for evaluation of the operational efficiency of the fluidic subsystem 10.

Figure 3:
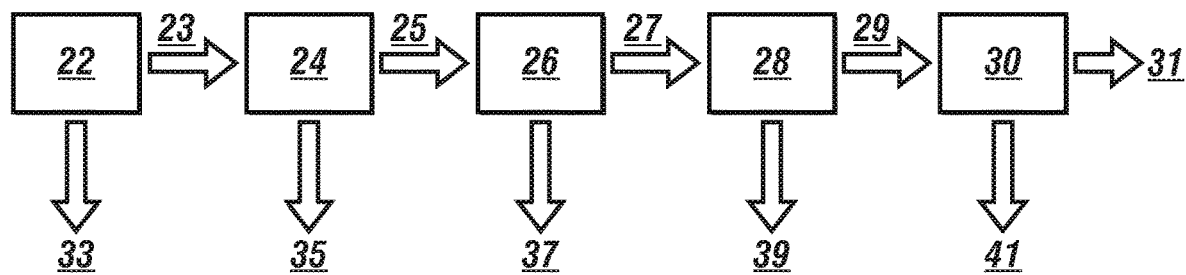
FIG. 3 schematically shows an analytical scheme for evaluating power flow and efficiency in the fluidic subsystem that is described with reference to FIG. 1, in accordance with the disclosure.

FIG. 3 schematically shows an analytical scheme for evaluating power flow and efficiency in the fluidic subsystem 10, originating with the DC power source 22 and resulting in work, i.e., fluidic flow 31 in the fluidic circuit 30. The power flow includes DC electric power 23 from the DC power source 22, with associated electrical efficiency 33; AC power 25 from the motor driver 24, with associated driver efficiency 35; rotational power (torque) from the electric machine 26, with associated mechanical or motor efficiency 37; pump flow 29 from the pump 28, with associated pump efficiency 39; and the fluidic flow 31 in the fluidic circuit 30, with associated efficiency 41. The battery efficiency 33 has an initial value that can decrease in service due to oxidation at the terminals of the DC power source 22, and/or occurrence of an open circuit or a short circuit. The driver efficiency 35 has an initial value that can decrease in service due to electro-magnetic interference, electrostatic discharge, a regulator fault, an amplifier fault or a software fault. The motor efficiency 37 has an initial value that can decrease in service due to connector faults, motor demagnetization, terminal or coil oxidation, or wear. The pump efficiency 39 has an initial value that can decrease in service due to a rotor wear or fault, a bearing fault or some form of physical damage to the impeller. The circuit efficiency 41 has an initial value that can decrease in service due to leakage, contamination, stuck valves or clogging. The foregoing efficiency terms can be classified into electric power efficiency, electro-mechanical power efficiency, and hydraulic efficiency.

Power efficiency in the fluidic subsystem 10 can be evaluated in terms of electric power losses and resulting electric power efficiency, electro-mechanical power losses and resulting electro-mechanical power efficiency, and hydraulic power losses and resulting hydraulic power efficiency.

The electric power efficiency can be determined as follows:

$$\eta_{ECU} = \frac{P_{AC}}{P_{DC}} = \frac{V_{Ac} \cdot I_{AC}}{V_{DC} \cdot I_{DC}} \quad [1]$$

wherein:
$P_{AC}$ represents AC power transferred from the motor driver 24 to the electric motor 26, and includes $V_{AC}$, which represents AC voltage, and $I_{AC}$, which represents AC current,
$P_{DC}$ represents DC power transferred from the DC power source 22 to the motor driver 24, and includes $V_{DC}$, which represents DC voltage, and $I_{DC}$, which represents DC current.

The electric power efficiency can be expressed as a nominal value, i.e., $\eta_{ECU}^{Nom}$ and as an actual value, i.e., $\eta_{ECU}^{Act}$. The nominal efficiency value represents an ideal value for the efficiency under a prescribed set of ambient circumstances, e.g., temperature, pressure, etc., when the DC power source 22 and the motor driver 24 are operating at specified loading conditions and are functioning according to manufacturing and design specifications. The actual efficiency value represents an actual value for the efficiency under real-time operating conditions, and real-time ambient circumstances with attendant wear or deterioration.

A real-time state of health (SOH) value $H_{ECU}$ can be determined for the electric power efficiency as follows:

$$H_{ECU} = f_{ECU}\left(\frac{\eta_{ECU}^{Act}}{\eta_{ECU}^{Nom}}\right) \quad [2]$$

wherein $f_{ECU}$ represents a calibrated scalar term that is determined based upon the present operating conditions.

The electro-mechanical power efficiency can be determined as follows:

$$\eta_{motor} = \frac{P_{mech}}{P_{AC}} = \frac{T \cdot \omega}{V_{Ac} \cdot I_{AC}} \quad [3]$$

wherein:

$P_{mech}$ represents the mechanical power, which can be determined based upon torque, T and rotational speed, $\omega$ of the electric motor 26; and $P_{AC}$ represents electric power, which can be determined based upon input voltage $V_{AC}$ and input current $I_{AC}$ to the electric motor 26.

The electro-mechanical power efficiency can be expressed as a nominal value, i.e., $\eta_{Motor}^{Nom}$ and as an actual value, i.e., $\eta_{Motor}^{Act}$. The nominal efficiency value represents an ideal value under a prescribed set of ambient circumstances, e.g., temperature, pressure, etc., when the electric machine 26 and pump 28 are operating at specified loading conditions and are functioning according to manufacturing and design specifications. The actual efficiency value represents an actual value for the efficiency under real-time operating conditions, and real-time ambient circumstances with attendant wear or deterioration.

A real-time state of health (SOH) value $H_{Motor}$ can be determined for the electro-mechanical power efficiency as follows:

$$H_{Motor} = f_{Motor}\left(\frac{\eta_{Motor}^{Act}}{\eta_{Motor}^{Nom}}\right) \quad [4]$$

wherein $f_{Motor}$ represents a calibrated scalar term that is determined based upon the present operating conditions.

The hydraulic power efficiency can be determined as follows:

$$\eta_{pump} = \frac{P_{hydr}}{P_{work}} = \frac{\Delta P \cdot \alpha_{flow}}{T \cdot \omega} \quad [5]$$

wherein:

$P_{hydr}$ represents hydraulic power, which can be determined based upon a pressure differential $\Delta P$ and mass flowrate $\alpha_{flow}$ in the fluidic circuit 30, and $P_{work}$, represents the mechanical power, which can be determined based upon torque, T and rotational speed, $\omega$ of the pump 28;

The hydraulic power efficiency can be expressed as a nominal value, i.e., $\eta_{Pump}^{Nom}$ and as an actual value, i.e., $\eta_{Pump}^{Act}$. The nominal efficiency value represents an ideal value under a prescribed set of ambient circumstances, e.g., temperature, pressure, etc., when the pump 28 is operating at specified loading conditions in the fluidic circuit 30 and both functioning according to manufacturing and design specifications. The actual efficiency value represents an actual value for the efficiency under real-time operating conditions, and real-time ambient circumstances with attendant wear or deterioration.

A real-time state of health (SOH) value $H_{Pump}$ can be determined for the hydraulic power efficiency as follows:

$$H_{Pump} = f_{Pump}\left(\frac{\eta_{Pump}^{Act}}{\eta_{Pump}^{Nom}}\right) \quad [6]$$

wherein $f_{Pump}$ represents a calibrated scalar term that is determined based upon the present operating conditions.

A SOH term for the fluidic subsystem 10 can be determined in terms of the electric power efficiency, the electro-mechanical power efficiency, and the hydraulic power efficiency, as follows:

$$H_{sys} = H_{ECU} \times H_{Motor} \times H_{Pump} \quad [7]$$

The SOH term for the fluidic subsystem 10 can be determined at each of a plurality of operating conditions encompassing a range of flowrates, pressures, ambient conditions, and other factors, and subjected to filtering.

The actual values for the electric power efficiency $\eta_{ECU}$, the electro-mechanical power efficiency $\eta_{Motor}$ and the hydraulic power efficiency $\eta_{Pump}$ can be evaluated to isolate a fault in the fluidic subsystem 10 when the SOH, i.e., $H_{sys}$ as determined via EQ. 7, indicates occurrence of a fault in the fluidic subsystem 10. Table 1 indicates a likely location of a plurality of faults in the fluidic subsystem 10 in relation to the efficiencies. In Table 1, the "X" is employed to indicate a location and likelihood of a fault when the corresponding efficiency falls below a threshold level. This information can be employed to isolate a fault for purposes of servicing the fluidic subsystem 10.

TABLE 1

| Fault Location | $\eta_{ECU}$ | $\eta_{Motor}$ | $\eta_{Pump}$ |
|---|---|---|---|
| Motor driver/motor controller | X | | |
| Motor-short | | X | |
| Motor-Resistance increase | | X | |
| Motor-Demagnetization | | X | |
| Pump-Bearing | | X | X |
| Pump-Impeller | | | X |
| Circuit-Leak | | | X |
| Circuit-valve | | | X |

The severity of a fault can be estimated based upon the magnitude of deviation from nominal efficiency values. Data recording can include periodic and/or event-based recording of operating parameters, single time-point recording of operating parameters and/or consecutive time-point recording of operating parameters for certain time duration, such as before and/or after the trigger of an event. Such data recording can be accomplished employing circular memory buffers or another suitable memory device.

Figure 4:
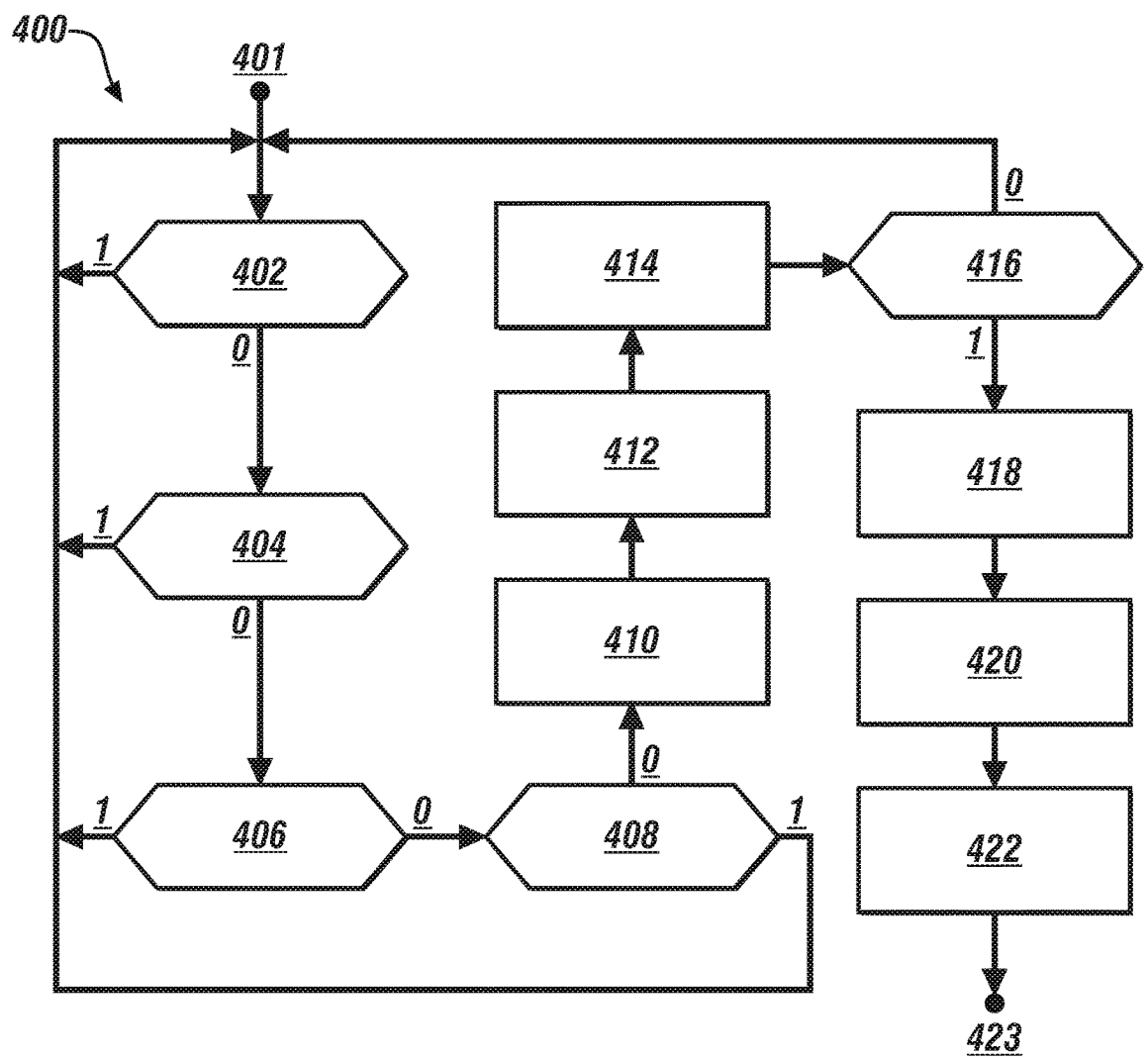
FIG. 4 schematically shows a routine that is executed to monitor an embodiment of the fluidic subsystem that is described with reference to FIG. 1, including a process to detect and isolate a fault in the fluidic subsystem during vehicle operation, in accordance with the disclosure.

FIG. 4 schematically shows a routine 400 that is executed to monitor an embodiment of the fluidic subsystem 10 that is described with reference to FIG. 1 on a vehicle. The routine 400 includes a process to detect and isolate a fault in the fluidic subsystem 10 during vehicle operation. Table 2 is provided as a key wherein the numerically labeled blocks and the corresponding functions are set forth as follows, corresponding to the routine 400. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
|---|---|
| 401 | Start |
| 402 | Fault with DC power source fault? |
| 404 | Fault with electric machine, motor driver, sensors? |
| 406 | Limitation on mechanical power? |
| 408 | Has operating point been updated recently? |
| 410 | Calculate instantaneous energy efficiency |
| 412 | Update efficiency curves |
| 414 | Estimate SOH |
| 416 | Trip ended? |
| 418 | Store efficiency values and SOH |
| 420 | Communicate SOH, Efficiency |
| 422 | Execute fault isolation |
| 423 | End |

The steps of the routine 400 may be executed in a suitable order, and are not limited to the order described with reference to FIG. 4. The designation "1" indicates the associated condition has been met, and the designation "0" indicates the associated condition has not been met. The routine 400 initiates execution during vehicle operation (401), and includes determining occurrence of a fault with the DC power source 22 (402) and determining occurrence of a fault with the motor driver 24 and the electric machine 26 (404), wherein occurrence of such faults can be determined employing sensors, simulations and fault monitoring routines that are periodically executed, e.g., as elements of on-board diagnostic routines.

A detected occurrence of a fault with the DC power source 22 (402)(1) or with the motor driver 24 or the electric machine 26 (404)(1) results in an end of the present iteration of the routine 400. When no fault is detected with the DC power source 22 (402)(0), the motor driver 24 and the electric machine 26 (404)(0), the routine 400 determines whether an operational limitation has been imposed on the fluidic subsystem 10, such as an upper power limitation, an imposed limitation on an operating gear, etc. (406). When there is an imposed operational limitation (406)(1), the present iteration of the routine ends. When there is no imposed operational limitation (406)(0), the routine verifies whether the operating point has been updated recently (408), and if so (408)(1), the present iteration of the routine ends. When the operating point has not been updated recently (408)(0), the routine determines values for the electric power efficiency $\eta_{ECU}$, the electro-mechanical power efficiency $\eta_{Motor}$ and the hydraulic power efficiency $\eta_{Pump}$, employing EQS. 1, 3 and 5 and operating parameters that have been captured during operation (410). Efficiency curves associated with the respective systems can also be updated based upon the captured data, including the operating parameters (412). The routine then estimates the SOH of the fluidic subsystem 10, employing EQS. 2, 4, 6 and 7 (414). The routine 400 iteratively executes until the present trip ends (416)(0). When the present trip ends (416)(1), The SOH and the efficiency values are captured and stored in a non-volatile memory device on-vehicle (418), and communicated to an off-vehicle server via the telematics device 70 (420). The routine 400 evaluates the SOH and the efficiency values in context of the information related to the location and likelihood of a fault with the fluidic subsystem 10 that is presented in Table 1 (422). This includes a system-level synthesis of patterns associated with the power efficiency parameters that are detailed herein, including Table 1. The routine 400 communicates the results to the off-vehicle server 95 via the telematics device 70, and this iteration ends (423).

Figure 2:
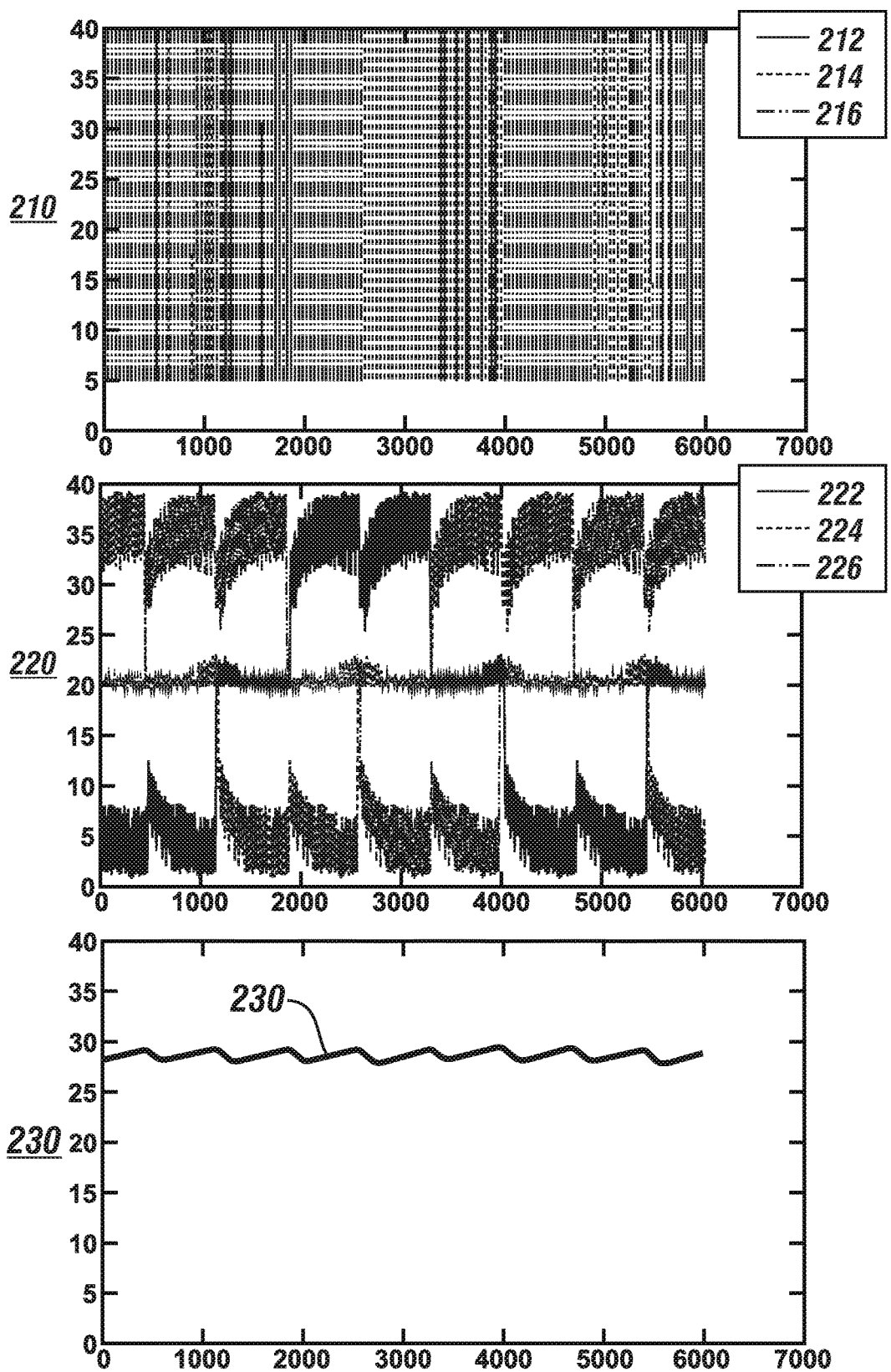
FIG. 2 graphically shows voltage that is transferred from the motor controller to the electric machine, current that is transferred from the motor controller to the electric machine, and total electric power that is transferred from the motor controller to the electric machine in relation to time on the horizontal axis, in accordance with the disclosure.

By employing the power signals described with reference to FIGS. 2-1, 2-2 and 2-3, the data employed by the routine 400 is steadier as compared with phase current/voltage measurements in a brushless motor, and is thus more robust and accurate. Furthermore the data is suitable for low rate bus communication for remote diagnosis and prognosis routines.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for monitoring a fluidic subsystem disposed on a vehicle, the fluidic subsystem including an electric motor electrically connected to a motor driver and rotatably connected to a fluidic pump that is disposed in a fluidic circuit, the method comprising:
   determining operating parameters associated with the fluidic subsystem;
   determining a plurality of power efficiency parameters for the fluidic subsystem based upon the operating parameters, wherein the power efficiency parameters include a hydraulic power efficiency, an electro-mechanical power efficiency and an electric power efficiency; wherein determining the electric power efficiency includes:
      determining DC electric power including a DC current and a DC voltage delivered to the motor driver, determining AC electric power including an AC current and an AC voltage delivered from the motor driver to the electric motor, and determining the electric power efficiency based upon a ratio of the DC electric power and the AC electric power;

determining a state of health for the fluidic subsystem based upon the power efficiency parameters;

detecting a fault in the fluidic subsystem when the state of health is less than a threshold state of health; and communicating the fault to an on-board controller.

2. The method of claim 1, wherein determining the electro-mechanical power efficiency comprises:

determining AC electric power including an AC current and an AC voltage delivered from the motor driver to the electric motor;

determining mechanical power generated by the electric motor, including a torque output and a rotational speed of the electric motor; and determining the electro-mechanical power efficiency based upon a ratio of the AC electric power and mechanical power.

3. The method of claim 1, wherein determining the hydraulic power efficiency comprises:

determining mechanical power transferred from the electric motor to the fluidic pump, including a torque output and a rotational speed of the electric motor;

determining hydraulic power output from the fluidic pump, including a pressure differential and a mass flowrate in the fluidic circuit; and determining the hydraulic power efficiency based upon a ratio of the mechanical power and the hydraulic power.

4. The method of claim 1, wherein determining the state of health (SOH) for the fluidic subsystem based upon the power efficiency parameters comprises determining a first SOH parameter based upon the hydraulic power efficiency and a nominal hydraulic power efficiency;

determining a second SOH parameter based upon the electro-mechanical power efficiency and a nominal electro-mechanical power efficiency;

determining a third SOH parameter based upon the electric power efficiency and a nominal electric power efficiency; and determining the SOH for the fluidic subsystem based upon the first SOH parameter, the second SOH parameter and the third SOH parameter.

5. The method of claim 1, further comprising determining a fault in an element of the fluidic subsystem based upon the power efficiency parameters.

6. The method of claim 5, comprising determining a fault associated with the motor driver when the electric power efficiency is less than an associated threshold efficiency level.

7. The method of claim 5, comprising determining a fault associated with the electric motor when the electro-mechanical power efficiency is less than an associated threshold efficiency level.

8. The method of claim 5, comprising determining a fault associated with the fluidic pump when the hydraulic power efficiency is less than an associated threshold efficiency level.

9. The method of claim 1, wherein communicating the fault to an on-board controller further comprises communicating the fault to a human-machine interface device in communication with the on-board controller.

10. The method of claim 1, further comprising communicating the fault to an off-vehicle controller via a telematics device in communication with the on-board controller.

11. The method of claim 1, further comprising isolating the fault in the fluidic subsystem to one of the electric motor, the motor driver or the fluidic pump based upon the plurality of power efficiency parameters.

12. A vehicle including a fluidic subsystem disposed thereon, comprising:

an electric motor electrically connected to a motor driver and rotatably connected to a fluidic pump that is disposed in a fluidic circuit of the vehicle, a controller in communication with the electric motor, the motor driver and the fluidic circuit, the controller including an instruction set, the instruction set executable to:

determine operating parameters associated with the fluidic subsystem;

determine a plurality of power efficiency parameters for the fluidic subsystem based upon the operating parameters, wherein the power efficiency parameters include a hydraulic power efficiency, an electro-mechanical power efficiency and an electric power efficiency;

wherein the instruction set executable to determine the electric power efficiency includes:

determining DC electric power including a DC current and a DC voltage delivered to the motor driver, determining AC electric power including an AC current and an AC voltage delivered from the motor driver to the electric motor, and determining the electric power efficiency based upon a ratio of the DC electric power and the AC electric power;

determine a state of health for the fluidic subsystem based upon the power efficiency parameters;

detect a fault in the fluidic subsystem when the state of health is less than a threshold state of health; and communicate the fault to a vehicle operator.

13. The vehicle of claim 12, further comprising a telematics device, wherein the controller is configured to communicate the fault to an off-board controller via the telematics device.

14. The vehicle of claim 12, further comprising the instruction set executable to isolate the fault in the fluidic subsystem to one of the electric motor, the motor driver or the fluidic pump based upon the plurality of power efficiency parameters.

15. A method for monitoring a fluidic subsystem disposed on a vehicle, wherein the fluidic subsystem includes an electric motor electrically connected to a motor driver and rotatably connected to a fluidic pump that is disposed in a fluidic circuit, and the vehicle includes a telematics device, the method comprising:

monitoring operating parameters associated with the fluidic subsystem;

communicating, via the telematics device, the parameters associated with operation of the fluidic subsystem to a remote server; and determining, via the remote server, a plurality of power efficiency parameters for the fluidic subsystem based upon the operating parameters, wherein the power efficiency parameters include a hydraulic power efficiency, an electro-mechanical power efficiency and an electric power efficiency; wherein determining the electric power includes:

determining DC electric power including a DC current and a DC voltage delivered to the motor driver, determining AC electric power including an AC current and an AC voltage delivered from the motor driver to the electric motor, and determining the electric power efficiency based upon a ratio of the DC electric power and the AC electric power;

determining, via the remote server, a state of health for the fluidic subsystem based upon the power efficiency parameters;

detecting, via the remote server, a fault in the fluidic subsystem when the state of health is less than a threshold state of health;

isolating the fault in the fluidic subsystem to one of the electric motor, the motor driver or the fluidic pump based upon the plurality of power efficiency parameters; and communicating the isolated fault to an on-vehicle controller.

16. The method of claim 15, wherein determining the electro-mechanical power efficiency comprises:

determining AC electric power including an AC current and an AC voltage delivered from the motor driver to the electric motor;

determining mechanical power generated by the electric motor, including a torque output and a rotational speed of the electric motor; and determining the electro-mechanical power efficiency based upon a ratio of the AC electric power and mechanical power.

17. The method of claim 15, wherein determining the hydraulic power efficiency comprises:

determining mechanical power transferred from the electric motor to the fluidic pump, including a torque output and a rotational speed of the electric motor;

determining hydraulic power output from the fluidic pump, including a pressure differential and a mass flowrate in the fluidic circuit; and determining the hydraulic power efficiency based upon a ratio of the mechanical power and the hydraulic power.

18. The method of claim 15, wherein determining the state of health (SOH) for the fluidic subsystem based upon the power efficiency parameters comprises determining a first SOH parameter based upon the hydraulic power efficiency and a nominal hydraulic power efficiency;

determining a second SOH parameter based upon the electro-mechanical power efficiency and a nominal electro-mechanical power efficiency;

determining a third SOH parameter based upon the electric power efficiency and a nominal electric power efficiency; and determining the SOH for the fluidic subsystem based upon the first SOH parameter, the second SOH parameter and the third SOH parameter.

19. The method of claim 15, further comprising determining a fault in an element of the fluidic subsystem based upon the power efficiency parameters.

* * * * *